United States Patent [19]

Fasano

[11] Patent Number: 4,667,272
[45] Date of Patent: May 19, 1987

[54] REPLACEMENT PROTECTOR BLOCK FOR TELEPHONE CIRCUITS

[75] Inventor: Michael Fasano, Syosset, N.Y.

[73] Assignee: Porta Systems Corp., Syosset, N.Y.

[21] Appl. No.: 799,309

[22] Filed: Nov. 18, 1985

[51] Int. Cl.⁴ .......................... H02B 1/20; H02B 1/16
[52] U.S. Cl. .................................. 361/394; 361/119; 361/426; 379/412
[58] Field of Search .............. 361/119, 124, 394, 426, 361/331, 429, 428; 179/91 R, 98; 339/18 B, 18 C, 198 R, 198 G, 198 K

[56] References Cited

U.S. PATENT DOCUMENTS

| | | | |
|---|---|---|---|
| 3,255,330 | 6/1966 | MacKenzie | 361/331 |
| 3,947,732 | 3/1976 | Cwirzen | 179/98 |
| 4,053,719 | 10/1977 | Debortoli | 361/428 |

FOREIGN PATENT DOCUMENTS 2042833  9/1980  United Kingdom .............. 361/426

Primary Examiner—G. P. Tolin
Attorney, Agent, or Firm—Charles E. Temko

[57] ABSTRACT

A protector block for connecting plural individual telephone subscriber circuits adapted to replace existing nonstandard installations to enable usage of standard protector modules is disclosed.

2 Claims, 2 Drawing Figures

REPLACEMENT PROTECTOR BLOCK FOR TELEPHONE CIRCUITS

BACKGROUND OF THE INVENTION

This invention relates generally to the field of telephony, and more particularly to an improved telephone protector block for mounting protector modules for individual subscriber circuits.

In the area of individual subscriber circuit protector modules which are carried by protector blocks mounted on a main frame in a telephone central office, there has been continuous improvement in technology over the last decade, offering degrees of protection previously unavailable and presently required by the use of solid state technology in central office switching equipment. The usual carbon block protector units are supplemented by highly sophisticated gas tube and heat coil technology, the manufacturing cost of which has been reduced to permit widespread usage in the art.

Such improvements have been designed with a view toward incorporation into module housings generally used in the continental United States, which housings are of elongated rectangular configuration having five projecting pins on one end thereof which engage corresponding sockets in individual areas on an exposed surface of a protector block. These pins are arranged in a generally rectangularly shaped pattern, with the tip in, tip out, ring in, and ring out pins being disposed at the corners of the rectangle, the ground pin being disposed slightly laterally relative to one of the sides of such rectangle.

In attempting to export the above-mentioned improved technology to foreign countries, particularly in the Far East, difficulties have been encountered by reason of the fact that existing protector blocks in such countries are of such configuration that interconnection with domestic modules is not possible without resort to an adaptor to compensate for relative differences in pin and terminal location. Because of space limitations, the use of such adaptors, in some cases, is difficult, if not impossible. In such cases, it becomes necessary to replace the existing protector block with a suitable block accepting standard protector modules. Such replacement must permit interfacing with existing wiring leading from the block to other equipment.

SUMMARY OF THE INVENTION

Briefly stated, the invention contemplates the provision of an improved protector or connector block construction which will fulfill the above requirements. The block includes a plurality of molded planar housings of insulative material, each having an edge surface having pin terminal openings for communicating with the pins on a protector module, and having elongated contact members therein leading to suitably located wire wrap pins in such manner that all of the contacts on a given module may communicate with wire wrap pins located substantially in a single plane. This is accomplished by providing internal connection between the planar housings through transversely extending spreadable contacts which are welded to a wire conductor in one housing, and other pins on the module are similarly connected to an adjacent housing in congruent relation to the first housing.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
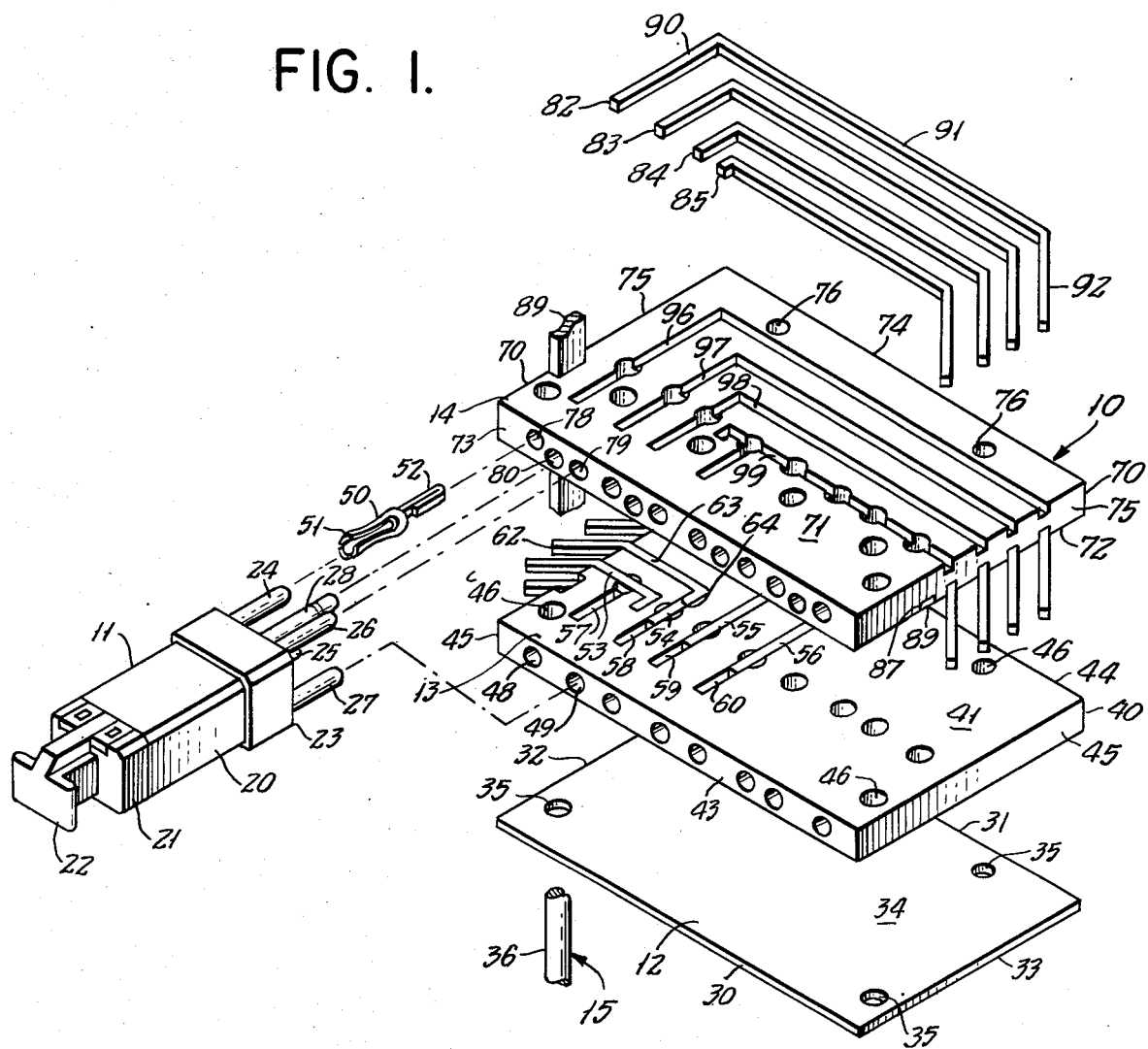
FIG. 1 is an exploded view in perspective of an embodiment of the invention.

In accordance with the invention, the device, generally indicated by reference character 10 is intended for use with a standard protector module 11 of a type in common use in the United States, the details of which form no part of the present disclosure. The device includes a plurality of insulative base members 12, a plurality of first housing elements 13, a plurality of second housing elements 14, and interconnecting means 15.

The module 11 is enclosed in a generally rectangular housing 20 having an end cap 21 with a manually engageable handle 22 at an outer end thereof. An inner end 23 is bounded by an end wall from which a plurality of contact pins project, these pins including the usual tip in 24, tip out pin 25, ring in pin 26, ring out pin 27, and ground pin 28.

The insulative members 12 are formed of thin planar synthetic resinous material, and are bounded by side edges 30 and 31 and end edges 32 and 33, as well as planar surfaces, one of which is indicated by reference character 34. Four through openings 35 are provided through which integrating rods 36 are inserted to enable the stacking of plural sets of housing elements 13 and 14.

The first housing elements 13 are all similar, each including a molded body 40 bounded by an upper surface 41, a lower surface 42, a front edge surface 43, a rear edge surface 44, and a pair of side edge surfaces 45. Bores 46 are alignable with openings 35 in the elements 12.

Extending inwardly from the front edge surface 43, are through bores 48 and 49 which mount barrel contacts 50 therein. The contacts 50 include a spreadable portion 51 which engage contact pins on the protector module 11 and a solid pin portion 52 which is welded to one of elongated wire wrap pins, four of which are indicated by reference characters 53, 54, 55 and 56. These are positioned in corresponding angular channels 57, 58, 59 and 60 in the upper surface 41. Each of the pins 53–56 includes an inner end 62, a medial segment 63, and an angularly disposed wire wrap segment 64 Interconnection with the corresponding barrel contacts 50 is preferably by resistance spot welding, a known technique in the art.

The second housing elements 14 are generally similar, each including a molded body 70, bounded by an upper surface 71, a lower surface 72, a front edge surface 73, a rear edge surface 74 and opposed side edge surfaces 75. Bores 76 correspond to bores 46. Bores 78 and 79 corespond to bores 48 and 49, respectively. Axially offset bores 80 accommodate the ground pin 28 and lead to a ground strip 89 in a channel 87. Elongated wire wrap pins 82, 83, 84 and 85 are disposed in corresponding channels 96, 97, 98 and 99. Each of the pins 82–85 includes an inner end 90, a medial segment 91 and an angularly disposed wire wrap segment 92.

Figure 2:
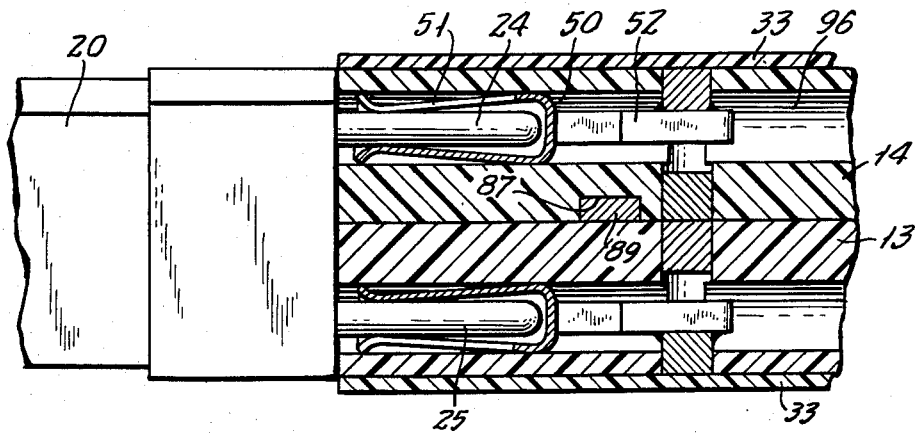
FIG. 2 is a fragmentary sectional view, partly in elevation, showing the embodiment in assembled condition, and corresponding to the plane 2—2 in FIG. 1.

The device is assembled as seen in FIG. 2 such that pairs of housing elements 13 and 14 are placed in congruent relation, and separated by insulative members 12. These are then bolted together in stacked relation to form a complete block, wherein each unit accommodates four protector modules, and the block in assembled condition is secured to a main frame (not shown) in any convenient manner.

We wish it to be understood that we do not consider the invention limited to the precise details of structure shown and set forth in this specification, for obvious modifications will occur to those skilled in the art to which the invention pertains.

We claim:

1. Improved telephone protector block construction comprising: a plurality of first housing elements, and a plurality of second housing elements; said first plurality of housing elements each having a planar insulative body of generally planar rectangular configuration, and bounded by opposed upper and lower surfaces, a forward edge surface, a rearward edge surface, and a pair of opposed side surfaces; said front edge surface having plural bores extending into said planar body, elongated barrel contacts positioned within said bores and selectively engaged with predetermined contact pins on protector modules; a corresponding plurality of elongated wire wrap pins, each including an inner end in electrical communication with a barrel contact, a medial segment lying in a corresponding trough in said planar body, and an exposed outer wire wrap terminal projecting from one of said side edge surfaces of said body; said second plurality of housing elements each including a planar insulative body of configuration substantially congruent to said planar body of said first plurality of housing elements, and bounded by an upper surface, a lower surface, a front edge surface, a rear edge surface, and a pair of opposed side edge surfaces; said front edge surface having plurality of bores extending into said last-mentioned planar body, elongated barrel contacts positioned within said last-mentioned bores, and selectively engaged with other predetermined contact pins on said protector modules; a second corresponding plurality of elongated wire wrap pins, each including an inner end in electrical communication with a barrel contact at an inner end thereof, a medial segment lying in a corresponding trough in said last-mentioned planar body, and an exposed wire wrap terminal projecting from one of said last-mentioned side edge surfaces, so as to be oppositely disposed relative to said first-mentioned wire wrap terminals on said first housing element; means mounting said first and second housing elements in assembled relation in pairs and in congruent stacked relation, whereby the bores in said first and second housing elements are in an aligned relation for the reception of the pins of protector modules.

2. Telephone connector block construction in accordance with claim 1, further comprising: a grounding strip positioned at a corresponding side surface of each of said first and second housing elements, and conductive means communicating with said ground strip to the ground pins of each of said protector modules.

* * * * *